(12) United States Patent
Shiner et al.

(10) Patent No.: US 11,665,492 B2
(45) Date of Patent: May 30, 2023

(54) IN-CEILING LOUDSPEAKER ASSEMBLY WITH DIGITAL INTERFACE

(71) Applicant: Crestron Electronics, Inc., Rockleigh, NJ (US)

(72) Inventors: Paul Shiner, Rockleigh, NJ (US); Ekin Binal, Rockleigh, NJ (US)

(73) Assignee: Crestron Electronics, Inc., Rockleigh, NJ (US)

( * ) Notice: Subject to any disclaimer, the term of this patent is extended or adjusted under 35 U.S.C. 154(b) by 0 days.

(21) Appl. No.: 16/589,944

(22) Filed: Oct. 1, 2019

(65) Prior Publication Data

US 2020/0112806 A1 Apr. 9, 2020

Related U.S. Application Data

(60) Provisional application No. 62/740,760, filed on Oct. 3, 2018.

(51) Int. Cl.
*H04R 27/00* (2006.01)
*H04R 3/14* (2006.01)
(Continued)

(52) U.S. Cl.
CPC ............. *H04R 27/00* (2013.01); *H04L 12/10* (2013.01); *H04L 61/5069* (2022.05);
(Continued)

(58) Field of Classification Search
CPC ........ G06F 1/1635; G06F 1/1683; G06F 1/18; G06F 1/181; G06F 1/189; G06F 3/16;
(Continued)

(56) References Cited

U.S. PATENT DOCUMENTS 5,054,076 A * 10/1991 Lowell ..................... H03G 3/02
381/109
8,385,561 B2 * 2/2013 Merrey .................... H04B 3/58
381/77

(Continued)

*Primary Examiner* — Thomas H Maung
(74) *Attorney, Agent, or Firm* — Crestron Electronics, Inc.

(57) ABSTRACT

A loudspeaker system is provided herein comprising: a digital transmitter adapted to store, retrieve, and transmit digital messages over a network cable using an audio over internet protocol (AoIP), and wherein the transmitted digital messages are individually addressable using an IP address, and wherein the transmitted digital messages contain digital audio messages and digital command and control messages; an endpoint enclosure adapted to have a unique IP address pre-assigned to it such that the endpoint enclosure is adapted to receive the transmitted digital messages addressed to it and extract the digital audio messages and the digital command and control messages from the transmitted and received digital messages, and wherein the endpoint enclosure comprises additional circuitry adapted to extract the digital audio messages from the received digital messages and power from the network cable, and generate an electrical audio signal from the extracted digital audio messages; an "N" position switch adapted to receive the electrical audio signal from the additional circuitry and output the same on one or more of "N" output ports based on the position of the switch; and a first set of loudspeakers adapted to receive the electrical audio signal and broadcast the same as an acoustic audio signal.

1 Claim, 10 Drawing Sheets

(51) Int. Cl.
*H04R 1/02* (2006.01)
*H04L 12/10* (2006.01)
*H04R 1/40* (2006.01)
*H04L 61/5069* (2022.01)

(52) U.S. Cl.
CPC .............. *H04R 1/025* (2013.01); *H04R 1/403* (2013.01); *H04R 3/14* (2013.01); *H04R 2201/021* (2013.01); *H04R 2227/003* (2013.01)

(58) Field of Classification Search
CPC ......... G06F 3/162; G06F 3/165; H04H 20/88; H04H 20/89; H04H 29/06476; H04H 60/58; H04L 12/10; H04L 12/2805; H04L 12/2812; H04L 12/40045; H04L 12/40117; H04L 2012/2849; H04L 25/05; H04L 29/06476; H04L 61/2069; H04R 1/025; H04R 1/403; H04R 2201/021; H04R 2201/028; H04R 2227/00; H04R 2227/003; H04R 2227/005; H04R 2227/08; H04R 2225/61; H04R 27/00; H04R 3/12; H04R 3/14; H04R 5/04
See application file for complete search history.

(56) References Cited

U.S. PATENT DOCUMENTS

| | | | |
|---|---|---|---|
| 2003/0210796 A1* | 11/2003 | McCarty | H04R 27/00 381/81 |
| 2004/0159490 A1* | 8/2004 | Marlin | H04R 9/02 181/148 |
| 2005/0031151 A1* | 2/2005 | Melillo | H04R 9/046 381/401 |
| 2006/0161964 A1* | 7/2006 | Chung | H04N 21/4854 725/141 |
| 2007/0263883 A1* | 11/2007 | Jakowski | H04R 3/00 381/110 |
| 2007/0297459 A1* | 12/2007 | Cucos | H04J 3/07 370/505 |
| 2008/0109095 A1* | 5/2008 | Braithwaite | H04L 67/10 700/94 |
| 2010/0284389 A1* | 11/2010 | Ramsay | H04N 21/42684 370/338 |
| 2013/0251163 A1* | 9/2013 | Adamson | H04R 3/00 381/58 |
| 2013/0251181 A1* | 9/2013 | Stewart, Jr. | H04R 1/02 381/332 |
| 2013/0329929 A1* | 12/2013 | Yoshida | H04R 1/02 381/334 |
| 2014/0064513 A1* | 3/2014 | Behringer | H03G 1/02 381/77 |
| 2016/0373878 A1* | 12/2016 | Burlingame | H03G 5/165 |
| 2017/0070195 A1* | 3/2017 | Arknæs-Pedersen | H03F 3/217 |
| 2017/0303042 A1* | 10/2017 | Hammer | H04R 3/12 |
| 2018/0220237 A1* | 8/2018 | Tabatabai | H04R 3/02 |
| 2018/0242062 A1* | 8/2018 | Kamihara | H04R 1/026 |
| 2018/0313558 A1* | 11/2018 | Byers | E04B 9/04 |
| 2019/0090041 A1* | 3/2019 | Ivey | H04R 1/025 |

\* cited by examiner

IN-CEILING LOUDSPEAKER ASSEMBLY WITH DIGITAL INTERFACE

PRIORITY INFORMATION

The present application claims priority under 35 U.S.C. § 119(e) to U.S. Provisional Patent Application Ser. No. 62/740,760, filed Oct. 3, 2018, the entire contents of which are expressly incorporated herein by reference.

BACKGROUND OF THE INVENTION

Technical Field

The embodiments described herein relate generally to in-ceiling loudspeakers assemblies, and more specifically to systems, methods, and modes for an in-ceiling loudspeaker system that comprises a completely digital interface and uses digital communications technologies to receive, process, and broadcast audio signals, among other types of digital signals.

Background Art

Existing in-ceiling loudspeaker assemblies are typically completely analog devices; that is, all of the signals that are received are analog. FIGS. 8A and 8B illustrate a use of a rotary power selection switch in conventional passive analog loudspeaker systems. Those of skill in the art can appreciate the usefulness of conventional rotary output power selection switches as shown in FIGS. 8A and 8B. Rotary switch 802 is a four position rotary switch, in this case, a four position switch. The switches are typically located on the speaker body itself. Analog audio is input to the speaker assembly, and passes through switch 802. Switch 802 has four outputs, which are connected to, in this case, a four output transformer 804. The output of transformer 804 can be sent to one or more loudspeakers 112b. As shown in FIG. 8B, the output power of the analog audio switch depends on which switch position is selected, as the audio signal is routed to a different input tap of transformer 804. That is, in switch position 1, the analog audio signal is sent to a first tap of transformer 804 that causes the output to be about 10 watts; in switch positions 2, 3, and 4, the respective output powers of transformer 804 can be 20 watts, 30 watts, and 40 watts.

In some cases, however, there are in-ceiling loudspeaker assemblies that combine digital and analog aspects. However, there is a need to implement a loudspeaker system that incorporates a complete digital interface and using digital communications technologies.

SUMMARY

It is an object of the embodiments to substantially solve at least the problems and/or disadvantages discussed above, and to provide at least one or more of the advantages described below.

It is therefore a general aspect of the embodiments to provide systems, methods, and modes for an in-ceiling loudspeaker system that comprises a completely digital interface and uses digital communications technologies to receive, process, and broadcast audio signals, among other types of digital signals that will obviate or minimize problems of the type previously described.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

According to a first aspect of the embodiments, a loudspeaker system is provided comprising: a digital transmitter adapted to store, retrieve, and transmit digital messages over a network cable using an audio over internet protocol (AoIP), and wherein the transmitted digital messages are individually addressable using an IP address, and wherein the transmitted digital messages contain digital audio messages and digital command and control messages; an endpoint enclosure adapted to have a unique IP address pre-assigned to it such that the endpoint enclosure is adapted to receive the transmitted digital messages addressed to it and extract the digital audio messages and the digital command and control messages from the transmitted and received digital messages, and wherein the endpoint enclosure comprises additional circuitry adapted to extract the digital audio messages from the received digital messages and power from the network cable, and generate an electrical audio signal from the extracted digital audio messages; an "N" position switch adapted to receive the electrical audio signal from the additional circuitry and output the same on one or more of "N" output ports based on the position of the switch; and a first set of loudspeakers adapted to receive the electrical audio signal and broadcast the same as an acoustic audio signal.

According to the first aspect of the embodiments, the endpoint enclosure is adapted to be an in-ceiling apparatus.

According to the first aspect of the embodiments, the endpoint enclosure replaces a standard ceiling tile.

According to the first aspect of the embodiments, the additional circuity comprises: a digital transceiver adapted to have a unique IP address pre-assigned to it, and which is adapted to receive the transmitted digital messages that are specifically addressed to the endpoint enclosure through use of the unique IP address.

According to the first aspect of the embodiments, the network cable comprises: a category 5 Ethernet (CAT5) cable, and further wherein the additional circuitry comprises a power-over-Ethernet extraction device for providing direct current (DC) power to additional components of the additional circuitry.

According to the first aspect of the embodiments, the additional circuitry comprises: a digital transceiver adapted to receive the transmitted digital messages, extract the digital audio messages, and convert and output the digital audio messages as an analog audio signal; and an analog audio amplifier adapted to receive the analog audio signal, amplify the analog audio signal, and output the analog audio signal to the "N" position switch, and wherein at least one loudspeaker in the first set of loudspeakers is electrically connected to each output of the "N" position switch, and further wherein one or more of the first set of loudspeakers is an active loudspeaker adapted to amplify the received analog audio signal, and any remaining loudspeakers of the first set of loudspeakers are passive loudspeakers.

According to the first aspect of the embodiments, the additional circuitry comprises: a digital transceiver adapted to receive the transmitted digital messages, extract the digital audio messages, and output the digital audio messages as a digital audio signal using an AoIP; a digital signal processor (DSP) adapted to receive the AoIP digital audio signal and perform digital signal processing on the received the AoIP digital audio signal and then output the processed AoIP digital audio signal to the "N" position switch, and wherein at least one loudspeaker is electrically connected to each output of the "N" position switch, and further wherein the first set of loudspeakers are adapted to extract the digital audio message from the received AoIP digital audio signal, convert the digital audio message to an analog audio signal, amplify the analog audio signal, and broadcast the analog audio signal as an acoustic audio signal.

According to the first aspect of the embodiments, the digital transceiver is further adapted to extract digital command and control signals from the digital messages, and wherein the digital messages contain programming information for the DSP to perform audio signal processing function on the received digital audio message digitally.

According to a second aspect of the embodiments a loudspeaker system is provided comprising: a digital transmitter adapted to store, retrieve, and transmit digital messages over a network cable using an audio over internet protocol (AoIP), and wherein the transmitted digital messages are individually addressable using an IP address, and wherein the transmitted digital messages contain digital audio messages and digital command and control messages; an endpoint enclosure adapted to have a unique IP address pre-assigned to it such that the endpoint enclosure is adapted to receive the transmitted digital messages and extract the digital audio messages and the digital command and control messages from the transmitted and received digital messages, and wherein the endpoint enclosure comprises additional circuitry adapted to extract the digital audio messages from the received digital messages and power from the network cable, and output digital audio messages as a digital audio signal using an AoIP; an "N" position switch adapted to receive the AoIP digital audio signal and output the same on one or more of "N" output ports based on the position of the switch; and a first set of active loudspeakers adapted to receive the AoIP digital audio signal and broadcast the same as an acoustic audio signal.

According to the second aspect of the embodiments, each of the first set of active loudspeakers comprises: a first set of circuitry adapted to extract the digital audio message from the AoIP digital audio signal, convert the digital audio message to an analog audio signal, amplify the analog audio signal, and broadcast the analog audio signal as an acoustic audio signal.

According to the second aspect of the embodiments, each of the first set of active loudspeakers further comprises: a second set of circuitry adapted to extract power for the first set of circuitry from the AoIP digital audio signal using a power-over-Ethernet power transfer mechanism and protocol.

According to the second aspect of the embodiments, each of the first set of active loudspeakers further comprises: frequency crossover circuitry adapted to provide bandwidth filtering to the analog audio signal such that two or more frequency bands of analog audio signals are generated and sent to respective loudspeakers within the active loudspeaker.

According to the second aspect of the embodiments, the additional circuitry in the endpoint enclosure comprises: a digital transceiver that includes a unique IP address, and which is adapted to receive the transmitted digital messages that are specifically addressed to the endpoint enclosure through use of the unique IP address, extract the digital audio messages, and output the digital audio messages as a digital audio signal using an AoIP; and a digital signal processor (DSP) adapted to receive the AoIP digital audio signal from the digital transceiver, and perform digital signal processing on the AoIP digital audio signal, and then output the processed AoIP digital audio signal to the "N" position switch.

According to the second aspect of the embodiments, the digital transceiver is further adapted to extract digital command and control signals from the digital messages, and wherein the digital messages contain programming information for the DSP to process the received digital audio message digitally.

According to the second aspect of the embodiments, the endpoint enclosure is adapted to be an in-ceiling apparatus.

According to the second aspect of the embodiments, the endpoint enclosure replaces a standard ceiling tile.

According to the second aspect of the embodiments, the network cable comprises: a category 5 Ethernet (CAT5) cable, and further wherein the additional circuitry comprises a power-over-Ethernet extraction device for providing direct current (DC) power to additional components of the additional circuitry.

According to a third aspect of the embodiments a loudspeaker system is provided, comprising: a digital transmitter adapted to store, retrieve, and transmit digital messages over a network cable using an audio over internet protocol (AoIP), and wherein the transmitted digital messages are individually addressable using an IP address, and wherein the transmitted digital messages contain digital audio messages and digital command and control messages; an endpoint enclosure adapted to have a unique IP address pre-assigned to it such that the endpoint enclosure is adapted to receive the transmitted digital messages and extract the digital audio messages and the digital command and control messages from the transmitted and received digital messages, and wherein the endpoint enclosure comprises additional circuitry adapted to extract the digital audio messages from the received digital messages and power from the network cable, and output digital audio messages as a digital audio signal using an AoIP; an output port adapted to receive and output the AoIP digital audio signal; and a first active loudspeaker adapted to receive the AoIP digital audio signal, extract the digital audio message from the AoIP digital audio signal, convert the extracted digital audio message to an analog audio signal, broadcast the analog audio signal as an acoustic audio signal, and transmit the analog audio signal to one or more passive speakers.

According to the third aspect of the embodiments, each of the active loudspeaker further comprises: a second set of circuitry adapted to extract power from the AoIP digital audio signal using a power-over-Ethernet power transfer mechanism and protocol.

According to the third aspect of the embodiments, the active loudspeaker further comprises: frequency crossover circuitry adapted to provide bandwidth filtering to the analog audio signal such that two or more frequency bands of analog audio signals are generated and sent to respective loudspeakers within the active loudspeaker; and an amplifier adapted to amplify the analog audio signal prior to transmission to the one or more passive speakers.

According to the third aspect of the embodiments, the additional circuitry in the endpoint enclosure comprises: a digital transceiver that includes a unique IP address, and which is adapted to receive the transmitted digital messages that are specifically addressed to the endpoint enclosure through use of the unique IP address, extract the digital audio messages, and output the digital audio messages as a digital audio signal using an AoIP; and a digital signal processor (DSP) adapted to receive the AoIP digital audio signal from the digital transceiver, and perform digital signal processing on the AoIP digital audio signal, and then output the processed AoIP digital audio signal to the output port.

According to the third aspect of the embodiments, the digital transceiver is further adapted to extract digital command and control signals from the digital messages, and wherein the digital messages contain programming information for the DSP to process the received digital audio message digitally.

According to the third aspect of the embodiments, the endpoint enclosure is adapted to be an in-ceiling apparatus.

According to the third aspect of the embodiments, the endpoint enclosure replaces a standard ceiling tile.

According to the third aspect of the embodiments, the network cable comprises: a category 5 Ethernet (CAT5) cable, and further wherein the additional circuitry comprises a power-over-Ethernet extraction device for providing direct current (DC) power to additional components of the additional circuitry.

According to the third aspect of the embodiments, the first active loudspeaker is adapted to obtain power from a second network audio cable connected to the output port of the enclosure through use of a power-over-Ethernet circuit.

According to a fourth aspect of the embodiments, an in ceiling loudspeaker system is provided comprising: a digital transmitter adapted to store, retrieve, and transmit digital messages over a network cable using an audio over internet protocol (AoIP), and wherein the transmitted digital messages are individually addressable using an IP address, and wherein the transmitted digital messages contain digital audio messages and digital command and control messages; and a first active loudspeaker adapted to have a unique IP address pre-assigned to it such that the endpoint enclosure is adapted to receive the transmitted digital messages and extract the digital audio messages and the digital command and control messages from the transmitted and received digital messages, and wherein the first active loudspeaker comprises additional circuitry adapted to extract the digital audio messages from the received digital messages and power from the network cable, and output digital audio messages as a digital audio signal using an AoIP, and further wherein the first active loudspeaker is further adapted to convert the extracted digital audio message to an analog audio signal, broadcast the analog audio signal as an acoustic audio signal, and transmit the analog audio signal to one or more passive loudspeakers.

According to the fourth aspect of the embodiments, the first active loudspeaker comprises: a power-over-Ethernet (PoE) power extraction device; a first amplifier adapted to be powered by the PoE power extraction device, and which is further adapted to amplify the analog audio signal prior to being broadcast by the first active loudspeaker; a variable output power amplifier comprising "M" output power selections and which is adapted to be powered by the PoE power extraction device, and which is further adapted to amplify the analog audio signal prior to being transmitted to one or more passive loudspeakers; and a power selection switch adapted to generate an output power selection signal that is transmitted to the variable output power amplifier to determine which of the M output power selections is chosen to amplify the analog audio signal prior to being transmitted to the one or more passive loudspeakers.

According to a fifth aspect of the embodiments, an in ceiling loudspeaker system is provided comprising: a digital transmitter adapted to store, retrieve, and transmit digital messages over a network cable using an audio over internet protocol (AoIP), and wherein the transmitted digital messages are individually addressable using an IP address, and wherein the transmitted digital messages contain digital audio messages and digital command and control messages; and a first active loudspeaker assembly adapted to have a unique IP address pre-assigned to it such that the first active loudspeaker assembly is adapted to receive the transmitted digital messages and extract the digital audio messages and the digital command and control messages from the transmitted and received digital messages, and wherein the first active loudspeaker assembly comprises a first loudspeaker, and additional circuitry adapted to extract the digital audio messages from the received digital messages, extract power from the network cable using a power-over-Ethernet (PoE) power extraction device, and output digital audio messages as a digital audio signal using an AoIP, and further wherein the additional circuitry is further adapted to convert the digital audio signal to an analog audio signal, broadcast the analog audio signal as an acoustic audio signal.

According to the fifth aspect of the embodiments, the loudspeaker system further comprises: a multi-output amplifier comprising "M" output power selections and which is adapted to be powered by the PoE power extraction device, and which is further adapted to amplify the analog audio signal prior to being transmitted to one or more externally connected loudspeakers; and an amplifier output selection switch (switch) adapted to generate an output signal that causes the multi-output amplifier to output the input analog audio signal to any one or more of the M outputs according to the output signal received by the multi-output amplifier.

According to the fifth aspect of the embodiments, the multi-output amplifier is further adapted to output an amplified version of the analog audio signal from a first output to the first loudspeaker at about 100% of an available output power when the switch is in a first position.

According to the fifth aspect of the embodiments, the multi-output amplifier is further adapted to output an amplified version of the analog audio signal from a first output to the first loudspeaker at about 50% of the available output power, and output an amplified version of the analog audio signal from a second output to a first externally located loudspeaker at about 50% of the available output power when the switch is in a second position.

According to the fifth aspect of the embodiments, the multi-output amplifier is further adapted to output an amplified version of the analog audio signal from a first output to the first loudspeaker at about 33% of the available output power, output an amplified version of the analog audio signal from a second output to a first externally located loudspeaker at about 33% of the available output power, and output an amplified version of the analog audio signal from a third output to a second externally located loudspeaker at about 33% of the available output power when the switch is in a third position.

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

DETAILED DESCRIPTION

Figure 1:
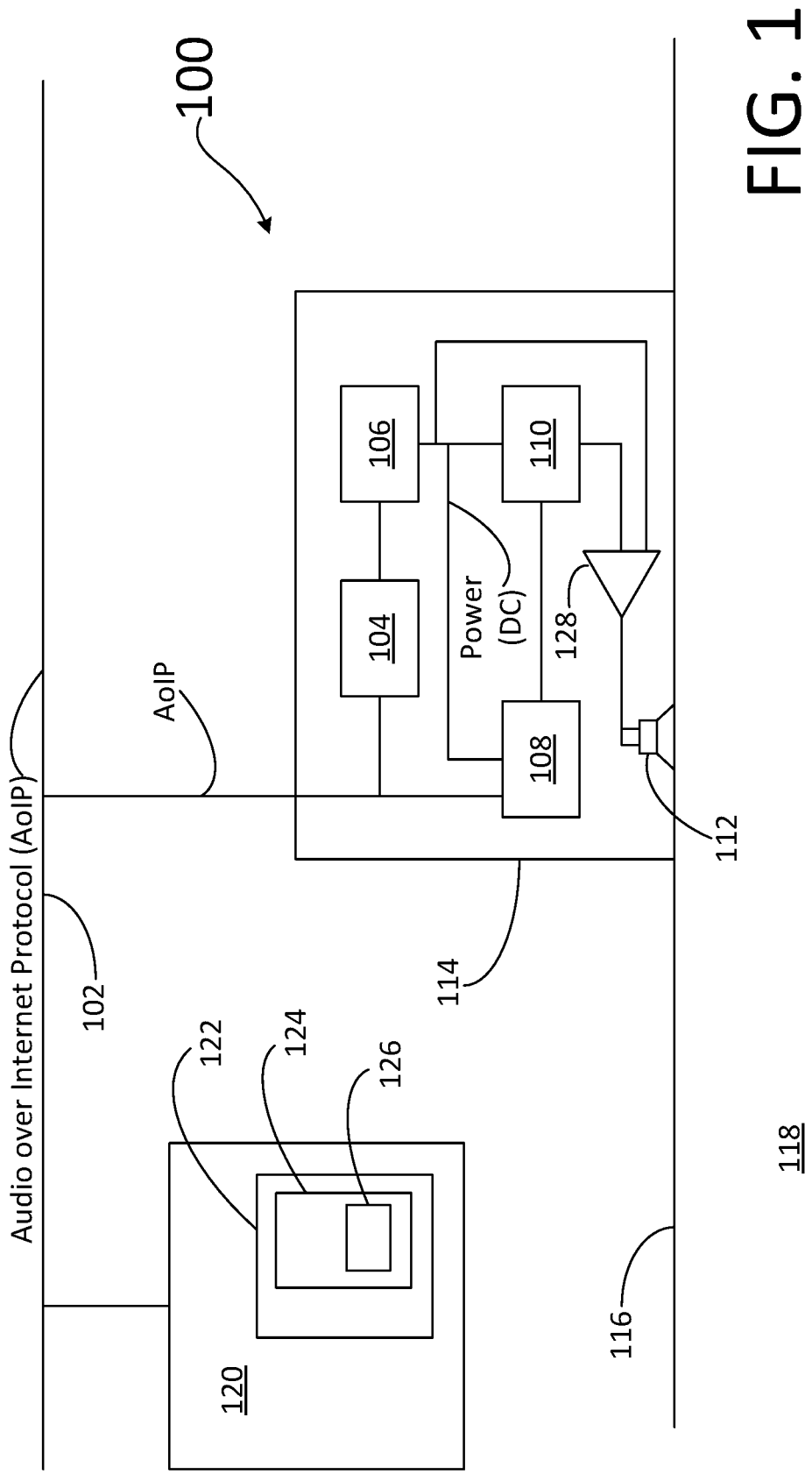
FIG. 1 illustrates a block diagram of an in-ceiling loudspeaker system with a digital interface according to aspects of the embodiments.

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The detailed description that follows is written from the point of view of a control systems company, so it is to be understood that the concepts discussed herein are applicable to various subsystems and not limited to only a particular controlled device or class of devices, such as loudspeaker assemblies, and more specifically, in-ceiling loudspeaker assemblies.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" or "in an embodiment" in various places throughout the specification is not necessarily referring to the same embodiment. Further, the particular feature, structures, or characteristics may be combined in any suitable manner in one or more embodiments.

LIST OF REFERENCE NUMBERS FOR THE ELEMENTS IN THE DRAWINGS IN NUMERICAL ORDER

The following is a list of the major elements in the drawings in numerical order.

100 In-Ceiling Mounted Loudspeaker System (Loudspeaker System) with a Digital Interface
102 Ethernet Network Cable
104 Power-over-Ethernet Extractor
106 Internal Power Supply
108 Digital Audio Transceiver (DAT)
110 Digital Signal Processor (DSP)
112 Loudspeaker
114 Loudspeaker System Enclosure (Enclosure)
116 Ceiling
118 Interior Space
120 Audio Source
122 Processor
124 Processor Memory
126 Audio Distribution Application (Audio App)
128 Integrated Amplifier (Chip-Amp)
200 In-Ceiling Mounted Loudspeaker System (Loudspeaker System) with a Digital Interface in a Star Configuration
300 In-Ceiling Mounted Loudspeaker System (Loudspeaker System) with a Digital Interface in a Star Configuration—Alternative Embodiment
400 In-Ceiling Mounted Loudspeaker System (Loudspeaker System) with a Power Management System
401 Audio By-pass Line (ABL)
402 Loudspeaker Selection Switch
404 PoE Powered Loudspeaker Amp
406 Active Loudspeaker
500 In-ceiling Mounted Loudspeaker System (Loudspeaker System) with an PoE Loudspeaker Selector Switch
501 Audio By-pass Line (ABL)
502 PoE Loudspeaker Selector Switch
600 In-ceiling Mounted Loudspeaker System (Loudspeaker System) with an PoE Loudspeaker Selector Switch
601 Audio By-pass Line (ABL)
700 In-ceiling Mounted Loudspeaker System (Loudspeaker System) with M-of-N Amplifier Output Selector Switch
702 Amplifier with Selectable Multiple Outputs
704 M-of-N Amplifier Output Selector Switch
802 Rotary Power Switch
804 Transformer
902 Active Amplifier Power Output Switch
1000 Active amplifier loudspeaker system for Use with Digital Audio over Internet Protocol Transmissions According to Aspects of the Embodiments.
1002 Amplifier Output Selection Switch
1004 Processing Circuitry
1006 Tri-Output Amplifier
1008 Loudspeaker Assembly

LIST OF ACRONYMS USED IN THE SPECIFICATION IN ALPHABETICAL ORDER

The following is a list of the acronyms used in the specification in alphabetical order.
ABL Audio By-pass Line
BMR Balanced Mode Radiator
DAT Digital Audio Transceiver
DSP Digital Signal Processor
IP Internet Protocol
PoE Power-Over-Ethernet The different aspects of the embodiments described herein pertain to the context of a completely digital interface in-ceiling loudspeaker system, but is not limited thereto, except as may be set forth expressly in the appended claims.

For 40 years Creston Electronics Inc., has been the world's leading manufacturer of advanced control and automation systems, innovating technology to simplify and enhance modern lifestyles and businesses. Crestron designs, manufactures, and offers for sale, integrated solutions to control audio, video, computer, and environmental systems. In addition, the devices and systems offered by Crestron streamlines technology, improving the quality of life in commercial buildings, universities, hotels, hospitals, and homes, among other locations. Accordingly, the systems, methods, and modes of the aspects of the embodiments described herein, as embodied as a Dante™ In-Ceiling Commercial Loudspeaker, can be manufactured by Crestron Electronics Inc., located in Rockleigh, N.J.

FIG. 1 illustrates a block diagram of an in-ceiling loudspeaker system with a digital interface (loudspeaker system) 100 according to aspects of the embodiments.

Loudspeaker system 100 comprises Ethernet network cable (network cable) 102, power-over-Ethernet (PoE) extractor 104, internal power supply 106, digital audio transceiver 108, digital signal processor (DSP) (which can include, among other audio signal processing functions, an integrated amplifier) 110, integrated circuit amplifier (Amp) 128, loudspeaker 112 (according to aspects of the embodiments, one type of loudspeaker that can be used is a balanced mode radiator (BMR) driver; BMR drivers are fairly well known and used in similar installation scenarios as in the aspects of the embodiments), and loudspeaker system enclosure (enclosure) 114. Enclosure 114 is mounted in ceiling 116 according to conventional mounting methods and apparatus known to those of skill in the art. That is, enclosure 114 can be fabricated or manufactured to fit into a standard 2'×2' ceiling tile location, or it can be fabricated or manufactured to fit into two ceiling tile locations (i.e., 2'×4'), or four ceiling tile locations (i.e., 4'×4') according to aspects of the embodiments. In addition, loudspeaker system 100 (and any of the other loudspeaker systems 200, 300, 400, 500, 600, and 700 described below are also similarly sized to fit into standard ceiling tile locations) interfaces with loudspeakers that are generally, although not necessarily, located in-ceiling as well, using well-known mounting and interconnection methods.

According to further aspects of the embodiments, each enclosure 114 can also be referred to as an "endpoint." According to further aspects of the embodiments, each of the endpoint/enclosures 114 can be separately and uniquely addressable and identifiable by a unique IP address. In this case, it is then possible to send different digital audio messages to different endpoints within a room in an enterprise location, as well as at different enterprise locations.

Also part of loudspeaker system 100 is audio source 120. Audio source 120 comprises, among other devices, processor 122, processor memory 124, and audio application (audio app) 126. Audio app 126, which comprises both local and remote versions, facilitates the storage, receipt, and transmission of digital audio data (which can include both audio and voice), as well as other digital command and control signals. Audio source 120 can be controlled remotely via a remote version of audio app 126 that interfaces with the local version (local referring to the component referred to as audio source 120 within loudspeaker system 100). Such communications can occur via network cable 102, or other wired means, or wireless technologies such as a Bluetooth transceiver, WiFi transceiver, satellite and/or cellular communications transceivers, and other wireless means, none of which are shown in the accompanying Figures, but which are well known to those of skill in the art. Also shown is interior space 118, which is the space into which acoustic audio signals are broadcast from one or more loudspeakers 112 according to aspects of the embodiments.

As those of skill in the art can appreciate, audio data is now most often transmitted or transferred to users in a digital format (with the exception of such transmissions as radio stations, and analog television stations); such digital transmissions, while suffering from such drawbacks such as increased bandwidth due to high sampling rates, nonetheless is very popular due to the ease in transmitting such audio signals over long distances with substantially high fidelity. Even in the presence of noise, which might severely impact an analog audio signal, digital transmission can remain relatively robust. Noise elimination and/or distortion prevention signaling techniques can make the digital signal relatively impervious to substantial amounts of noise that might otherwise severely distort an analog signal.

One form of such digital audio transmissions is Dante® (herein after "Dante"). Transmitting audio data using the systems and methods as developed and sold by Dante has been of tremendous benefit to those in the audio industry. Other systems and methods, including proprietary methods, can also be used. Although from time to time this discussion will refer to digital audio transmissions as being of the "Dante" type, it should not be perceived that such usage is to be taken in a limiting manner, as practically any form of digital audio transmission technology can be used. According to further aspects of the embodiments, Dante and other digital audio transmission systems use audio-over-IP (AoIP (internet protocol)) transmission protocols. For the purposes of this discussion, audio data will be considered, in a non-limiting manner, to be transmitted from audio source 120 to the various endpoints, enclosures 114, using AoIP; in addition, even following receipt of the digital audio signal at enclosure 114 and transceiver 108, audio data can be transmitted using AoIP between any and all of the components shown in all of the Figures, up to an including speakers 112 according to aspects of the embodiments. When audio data is transmitted using AoIP over a cat5 cable, it can include power-over-Ethernet (PoE) as well, which can be used to power individual components, including, but not limited to, any active speakers 112 that are used in any of the loudspeaker systems in any of the Figures. If the audio is in a different form, it will be so noted.

Audio data (in the form of a digital communications package) can be transmitted to one or more loudspeaker assemblies 100 from audio source 120, as more than one can be interconnected via a single Ethernet cable (which can be connected to enclosure 114 using an RJ-45 connector). In addition, because the data cable is an Ethernet cable, power can be transmitted in the form of power-over-Ethernet (PoE), and is received and extracted by PoE extractor 104. The output of PoE extractor 104 is sent to internal power supply (power supply) 106, which translates voltages and currents as needed, using well-known and understood technology, to get power to the various components of loudspeaker system 100 according to aspects of the embodiments.

Figure 3:
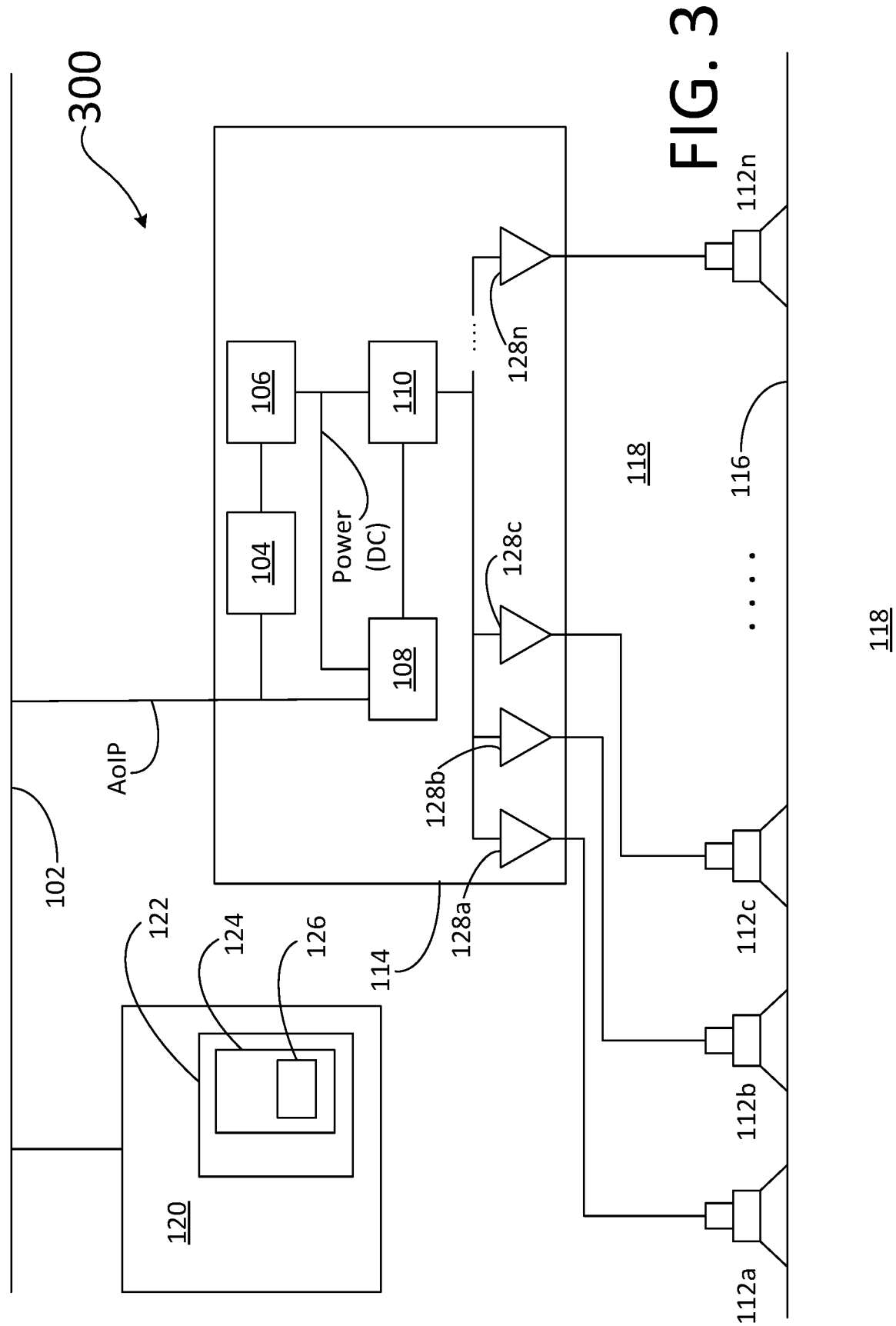
FIG. 3 illustrates a block diagram of an in-ceiling loudspeaker system with a digital interface according to still further aspects of the embodiments.

Power can be supplied by power supply 106 to digital audio transceiver 108, DSP 110, and amp 128 (these power lines are shown in several of the Figures, but have been omitted from FIG. 3 for the purpose of clarity). Digital audio transceiver 108 receives encoded digital audio data transmissions addressed to the particular loudspeaker system 100 (there can be plurality of loudspeaker systems 100a, 100b, and so on) each of which has a unique address, such as an internet protocol (IP) address. In addition, there can be additional circuitry located within enclosure 114 that monitors various status signals, such as environmental status (temperature, humidity, among others), current and voltage levels (among others), and other different status/environmental status signals, any and all of which can be transmitted back to a central processing station (not shown) for monitoring, and recording. In addition to the digital audio signals that can be transmitted to each loudspeaker system 100, other digitally encoded information can be provided such as phase and delay information. It is possible in a large enclosed environment, such as an assembly hall, it can be useful to delay audio broadcasting by loudspeaker systems 100 closer to the central processing system until the digital audio has a chance to be received and processed by additional loudspeaker systems located further away.

According to aspects of the embodiments, the other digitally encoded information can also be used to control DSP 110; such controls can take the form of equalization controls, bandwidth specifications, fading, ducking, and numerous other DSP functions. DSP 110 can include a digital and analog audio amplifier. Digital audio transceiver 108 can receive digitally encoded audio and translate it into an analog signal to be amplified by DSP 110, or digital audio transceiver 108 can receive digitally encoded audio and transfer it to DSP 110 in its original DSP form. DSP 110 can be digitally controlled by a local central processing system, such as audio source 120, or through audio source 120 via a remotely located server/computer via one or more of the network communication systems discussed above, which can include audio app 126. Such amplifier commands can be transmitted digitally using the digital audio communications system.

According to aspects of the embodiments, one type of loudspeaker 112 that can be used is a high efficiency BMR driver, which can be used in place of traditional cone driver. One such BMR® driver is manufactured by Cambridge Audio®. BMR drivers typically have greater dispersion through the important speech band (about 300 Hz to about 3400 Hz) and as a result they provide greater coverage per unit volume area in acoustic space (interior space) 118 according to aspects of the embodiments. However, as those of skill in the art can appreciate, loudspeakers manufactured by other companies can also be used (e.g., Bose®, Sonos®, among others).

Because loudspeaker system 100 is substantially completely digitally controlled, as opposed to most, if not all other conventionally available in-ceiling mounted loudspeaker systems, greater noise immunity is achieved according to aspects of the embodiments. Another benefit is the ability to monitor and quickly act upon anomalies that can occur in loudspeaker 112 and other components; that is, monitoring circuits can be incorporated and periodically checked to ascertain the status of the components such as loudspeaker impedance, amplifier gain, communications through-put, among other important parameters, according to aspects of the embodiments. Although not shown in the accompanying Figure, either or both analog and digital audio crossover networks can be incorporated along with two or more loudspeakers 112, each of which can be tuned to broadcast the particular frequency band to its matched crossover network output. Such cross over networks are known to those of skill in the art, and digital cross over networks can be controlled by the digital control system, such as by or through audio source 120.

Figure 2:
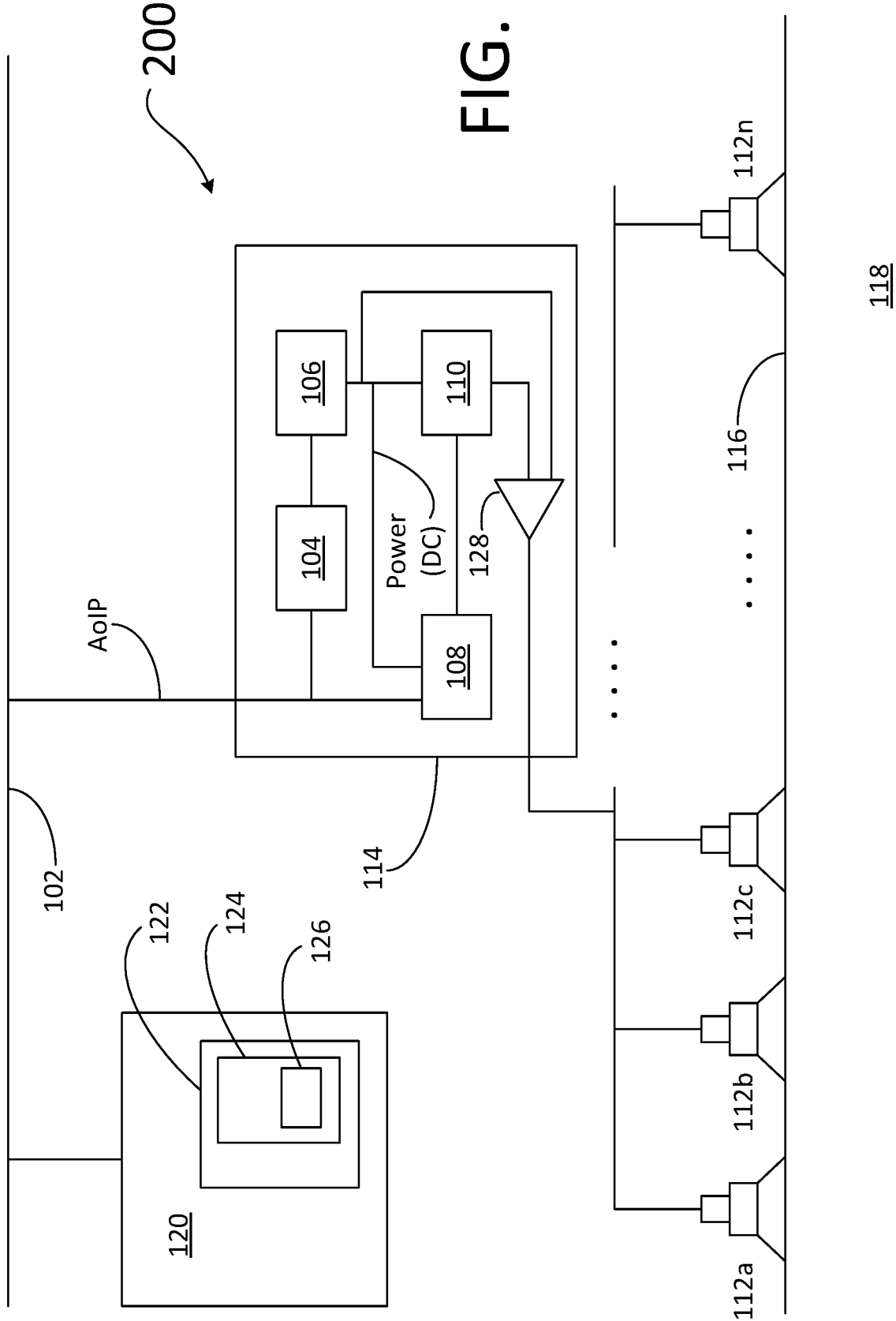
FIG. 2 illustrates a block diagram of an in-ceiling loudspeaker system with a digital interface according to further aspects of the embodiments.

FIG. 2 illustrates in-ceiling mounted loudspeaker system with a digital interface in a star interconnection configuration (loudspeaker system) 200 according to further aspects of the embodiments. Loudspeaker system 200 is substantially similar in terms of components as loudspeaker system 100, and thus, in fulfillment of the dual purposes of clarity and brevity, discussion of those components shall not be repeated. As can be seen, however, in an effort to save space and cost, a star interconnection system has been used in loudspeaker system 200. That is, instead of supplying multiple copies of enclosure 114 and all of the interior components 104, 106, 108, 110, and 128, one such enclosure 114 is used to supply analog audio to multiple loudspeakers 112a-n. As those of skill in the art can appreciate, however, the amplifier that can be part of DSP 110 must be able to produce enough current to drive multiple loudspeakers 112a-n in parallel, and thus is likely not to be (though not necessarily) the exact same version of the amplifier that can be part of DSP 110 or separate amp 128 that is used in loudspeaker system 200 according to aspects of the embodiments.

FIG. 3 illustrates in-ceiling mounted loudspeaker system with a digital interface in an alternative star interconnection configuration (loudspeaker system) 300 according to further aspects of the embodiments. Loudspeaker system 300 is substantially similar in terms of components as loudspeaker system 100 and loudspeaker system 200, and thus, in fulfillment of the dual purposes of clarity and brevity, discussion of those components shall not be repeated. As can be seen, however, in an effort to save space and cost, an alternative star interconnection system has been used in loudspeaker system 300. That is, instead of supplying multiple copies of enclosure 114 and some of the interior components 104, 106, 108, and 110, there one such enclosure 114 to supply analog audio to multiple loudspeakers 112a-n through multiple amps 128a-n. As those of skill in the art can appreciate, amps 128 can be fabricated as a single integrated circuit (IC); those that generate a high output signal (generally above 10 watts or so) may require the use of an external heat sink that can be attached to the IC through heat-conducting thermal glue.

In the embodiment of FIG. 3 there is shown one amp 128 for each loudspeaker 112. In this manner, as those of skill in the art can appreciate, a relatively lower power output amp 128 can be used as opposed to that in the embodiment of FIG. 2. Each amp 128a-n receives the same analog output from transceiver 108, which extracts the digital audio from the digital audio transmission message, and can also provide decoding (digital-to-analog conversion), and digital signal processing through optional DSP 110. According to further aspects of the embodiments, there can be one or more DSPs 110 in enclosure 114, or, alternatively, DSP 110 can provide different analog audio streams to each of, or smaller subsets of amps 128 (e.g., a separate analog signal for each 2 or "m" number of amps 128). According to still further aspects of the embodiments, amps 128 can be digital amps that can receive the audio signals digitally and convert them to analog audio signals prior to broadcast. In addition, each amp 128a-n also receives power from power supply 106.

Figure 4:
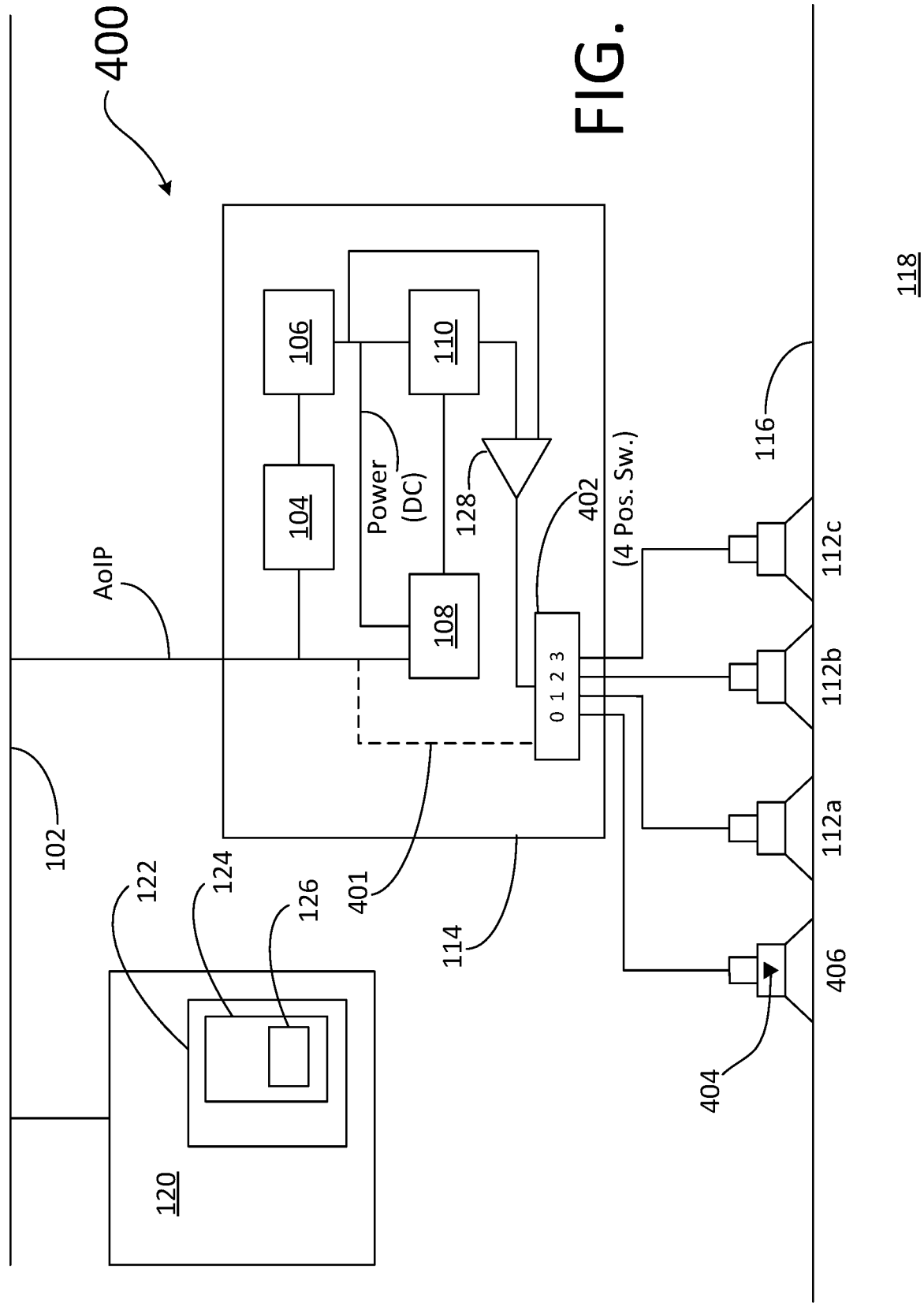
FIG. 4 illustrates a block diagram of an in-ceiling mounted loudspeaker system with a power management system according to aspects of the embodiments.

FIG. 4 illustrates in-ceiling mounted loudspeaker system with a power management system (loudspeaker system) 400 according to aspects of the embodiments. A substantial amount of the components of loudspeaker system 400 are substantially similar in form and function as those of loudspeaker systems 100, 200, and 300, and therefore, in fulfillment of the dual purposes of clarity and brevity, a detailed discussion will not be made of those components in regard to FIG. 4. The embodiments of FIG. 4, however, do contain additional features, such as loudspeaker selection switch (switch) 402. Switch 402 is a four position switch; it can route the output of amp 128 in analog form to one or more of loudspeakers 112a-c and active loudspeaker 406. In the case that the audio signal is in the form of AoIP, then amp 128 would not be connected to the output of DSP 110, and the output of DSP 110 would be connected to switch 402.

Further, each of speakers 112*a*-*c* would be an active loudspeaker 406 that can include circuitry to extract the digital audio signal, convert the same to an analog audio signal (digital-to-analog converter), and broadcast from the loudspeakers. In this case, PoE can be used to power the active loudspeaker 406. Active loudspeakers 406 can include not only speaker amp 404, but also active crossover networks, and can either route different frequency band signals to other speakers, or in the case of a loudspeaker with different bass, midrange, and treble loudspeakers, route the different bands of frequencies internally. If the output of transceiver 108 is an analog signal, then DSP 110 would not be connected to the output of transceiver 108, and instead can be connected either directly to switch 402 or the input of amp 128. Other configurations are also possible with switch 402.

If the audio signal is in an analog format, then there is no need for the additional digital extraction circuitry, and the loudspeakers can be passive loudspeakers 112 and active loudspeaker 406 can obtain power from internal power supply 106 (the interconnection not shown in FIG. 4).

According to aspects of the embodiments, switch 402 works in the following manner: in switch position 0, the audio signal is routed to active loudspeaker 406 only, where the audio signal undergoes further amplification via speaker amp 404 (though this not necessarily need be the case; that is, there does not need to always be speaker amp 404 in any of the speakers connected to the output of enclosure 114). In switch position 1, according to aspects of the embodiments, the audio signal (regardless of form), is sent to active loudspeaker 406 and loudspeaker 112*b*. In switch position 2, according to aspects of the embodiments, the audio signal (regardless of form), is sent to active loudspeaker 406, and loudspeakers 112*b*, and 112*c*. In switch position 3, according to aspects of the embodiments, the audio signal (regardless of form), is sent to active loudspeaker 406, and speakers 112*a*, 112*b*, and 112*c*. According to further aspects of the embodiments, any one or more of loudspeakers 112*a*-*c* can be replaced by active loudspeakers with their own respective speaker amps 404, and according to further aspects of the embodiments, there can be less than four loudspeakers, or even more loudspeakers, limited by power and space considerations but not a limitation to the aspects of the embodiments.

Figure 9:
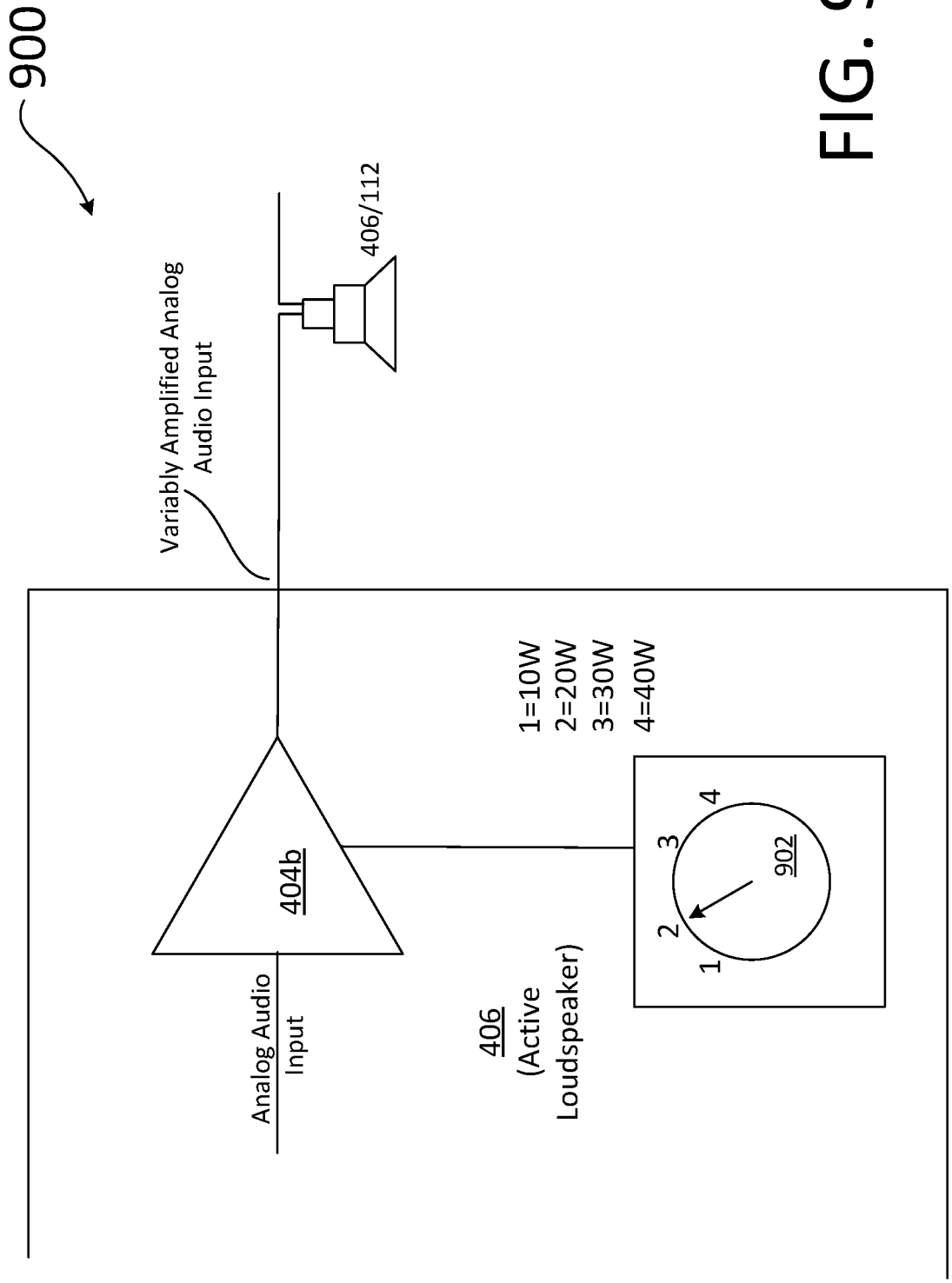
FIG. 9 illustrates an active amplifier power output switch circuit according to aspects of the embodiments.

Also shown in FIG. 4 is audio bypass line (ABL) 401. ABL 401 illustrates that the AoIP signal can be received directly by active speakers 406 through respective Ethernet connections according to aspects of the embodiments. That is, it is not necessary for AoIP signals to be received and processed using the additional circuitry located within enclosure 114, but that substantially similar circuitry can be located within each active loudspeaker 406 to receive the digital audio signal using an AoIP, extract the digital audio message or signal, convert the same to an analog audio signal, amplify it, perform other processing as necessary, and transmit the amplified/processed analog audio signal to other loudspeakers as the case may be. In addition, although not shown in FIG. 4, but which is shown in FIG. 9, there can be an audio rotary switch system 900 that can select a power output from an integrated circuit amplifier (IC Amp) through which the analog audio signal can be amplified and transmitted to other active or passive loudspeakers. FIG. 9 is described in greater detail below.

Figure 5:
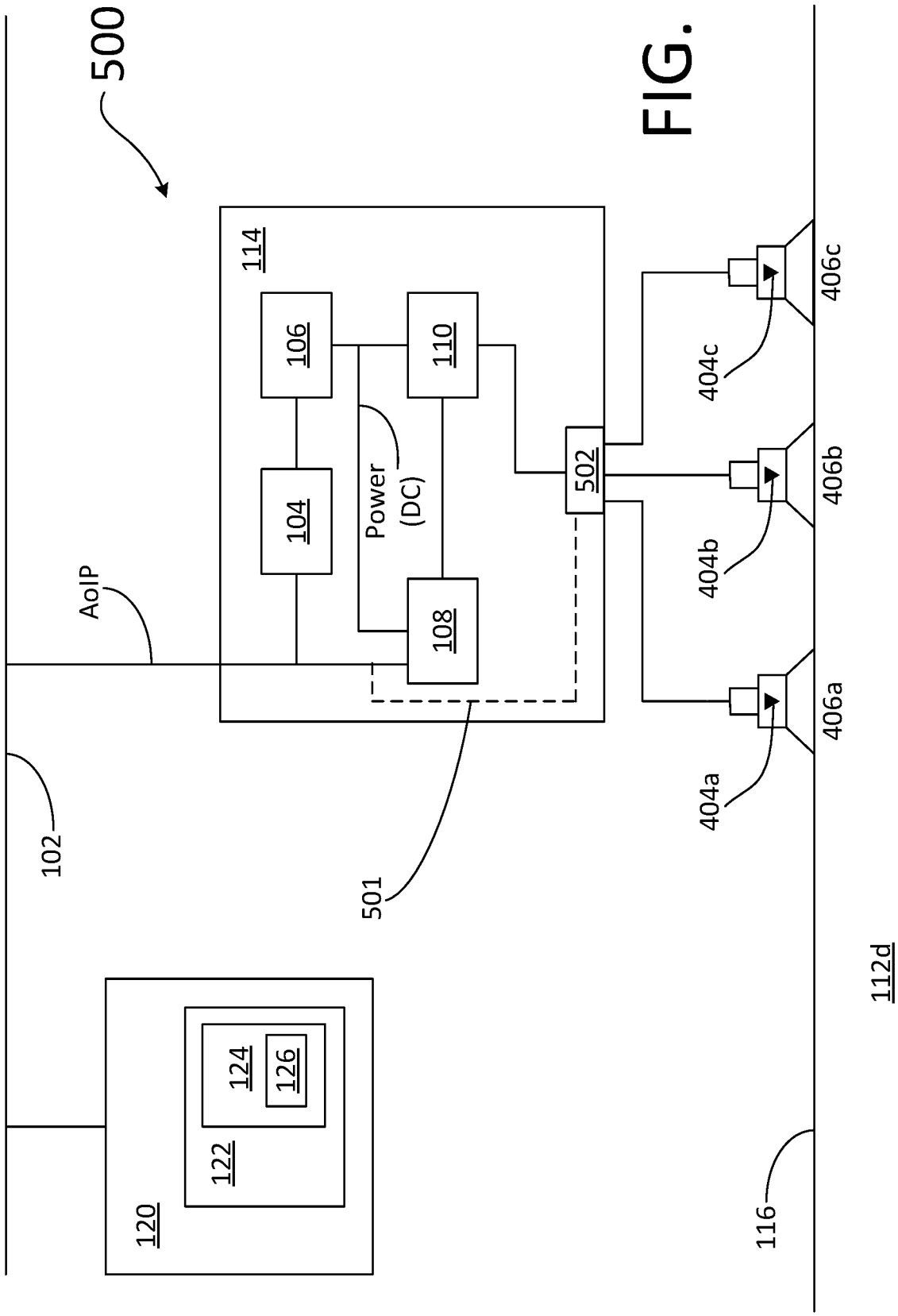
FIG. 5 illustrates a block diagram of an in-ceiling mounted loudspeaker system with a power-over-Ethernet selector switch according to aspects of the embodiments.

FIG. 5 illustrates a block diagram of an in-ceiling mounted loudspeaker system (loudspeaker system 500) with a power-over-Ethernet selector switch according to aspects of the embodiments.

A substantial portion of the components of loudspeaker system 500 are substantially similar in form and function as those of loudspeaker systems 100, 200, 300, and 400, and therefore, in fulfillment of the dual purposes of clarity and brevity, a detailed discussion will not be made of those components in regard to FIG. 5. The embodiments of FIG. 5, however, do contain additional features, such as PoE loudspeaker selection switch (switch) 502. Switch 502 is, in this case, a three position switch, though that need not necessarily be the case. Switch 502 can route the output of DSP 110 in digital (AoIP) form, to one or more of active loudspeakers 406*a*-*c*. Each of active loudspeakers 406*a*-*c* includes circuitry to extract the digital audio signal, convert the same to an analog audio signal, amplify it through speaker amp 404*a*-*c*, and broadcast from the loudspeakers. In this case, PoE can also be used to power the active loudspeakers 406*a*-*c*.

According to aspects of the embodiments, switch 502 works in the following manner: in its first position, the audio signal is routed to active loudspeaker 406*a* only, where the audio signal is amplified via speaker amp 404*a*. In a second switch position, according to aspects of the embodiments, the audio signal is sent to active loudspeakers 406*a* and 406*b*. In a third switch position, according to aspects of the embodiments, the audio signal is sent to active loudspeakers 406*a*, 406*b*, and 406*c*. Other sizes and configurations of switches are also possible. For example in a second position, perhaps the audio signal can be sent to only second active loudspeaker 406*b*, and the same for a third switch position. Then, there could be a fourth position that routes the audio signal to two different loudspeakers, such as active loudspeakers 406*a* and 406*b*, and so on. Those of skill in the art can appreciate that for each N active loudspeakers, in order to be able to route the audio signal to all different combinations, the switch must have 2N outputs. In this case, with three loudspeakers 406*a*-*c*, an eight output switch would be necessary. According to further aspects of the embodiments, PoE loudspeaker switch can send the audio signal to all three active loudspeakers 406*a*, 406*b*, and 406*c*. As those of skill in the art can further appreciate, a larger switch, with more output combinations can be used, as well as one with less, the number of active loudspeakers 406 limited by power and space considerations but not a limitation to the aspects of the embodiments.

Also shown in FIG. 5 is audio bypass line (ABL) 501. ABL 501 illustrates that the AoIP signal can be received directly by active speakers 406 through Ethernet connections according to aspects of the embodiments. That is, it is not necessary for AoIP signals to be received and processed using the additional circuitry located within enclosure 114, but that substantially similar circuitry can be located within each active loudspeaker 406 to receive the digital audio signal using an AoIP, extract the digital audio message or signal, convert the same to an analog audio signal, amplify it, perform other processing as necessary, and transmit the amplified/processed analog audio signal to other loudspeakers as the case may be. In addition, although not shown in FIG. 5, but which is shown in FIG. 9, there can be an audio rotary switch system 900 that can select a power output from an integrated circuit amplifier (IC Amp) through which the analog audio signal can be amplified and transmitted to other active or passive loudspeakers. FIG. 9 is described in greater detail below.

Figure 6:
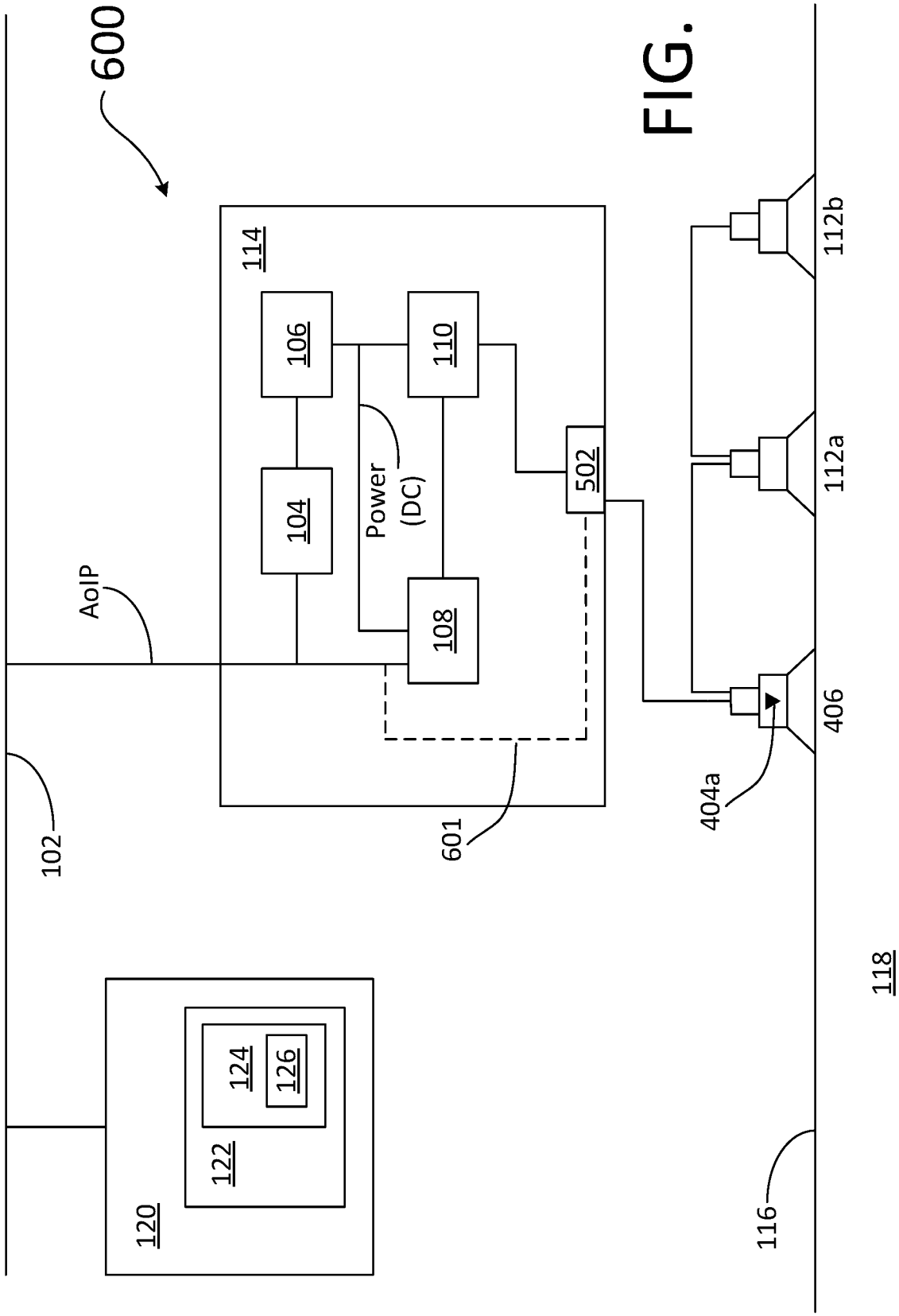
FIG. 6 illustrates a block diagram of an in-ceiling mounted loudspeaker system with a single output to a set of active and passive loudspeakers according to aspects of the embodiments.

FIG. 6 illustrates a block diagram of an in-ceiling mounted loudspeaker system (loudspeaker system 600) with a single output to a set of active and passive loudspeakers according to aspects of the embodiments.

A substantial portion of the components of loudspeaker system 600 are substantially similar in form and function as those of loudspeaker systems 100, 200, 300, 400, and 500, and therefore, in fulfillment of the dual purposes of clarity and brevity, a detailed discussion will not be made of those components in regard to FIG. 6. The embodiments of FIG. 6, however, do contain additional features, such as a different wiring configuration in regard to the output of switch 502. Switch 502, which can be a three (or more) position switch, is used to route digital audio as AoIP through to active loudspeaker 406. Active loudspeaker 406 includes circuitry to extract the digital audio signal, convert the same to an analog audio signal, perform frequency crossover if needed, and amplify the audio signal through speaker amp 404a and broadcast the same from the loudspeaker. In this case, PoE can also be used to power the active loudspeaker 406 because the audio signal is an AoIP signal with the power carried within the PoE cabling (Cat5) according to aspects of the embodiments. In addition to active loudspeaker 406, there is also shown loudspeakers 112a and 112b.

According to aspects of the embodiments, switch 502 forwards the digital audio signal to active loudspeaker 406, wherein frequency crossover can occur, digital and/or amplification and other filtering, and conversion to an analog signal via a DA converter. Then, the amplified analog audio signal is broadcast by active loudspeaker 406, and then sent to loudspeakers 112a and 112b that also broadcasts them into space 118. Both loudspeakers 112a and 112b rely on the amplification that occurs in active loudspeaker 406 for amplification, as they are typical passive loudspeakers.

Also shown in FIG. 6 is audio bypass line (ABL) 601. ABL 601 illustrates that the AoIP signal can be received directly by active speakers 406 through Ethernet connections according to aspects of the embodiments. That is, it is not necessary for AoIP signals to be received and processed using the additional circuitry located within enclosure 114, but that substantially similar circuitry can be located within each active loudspeaker 406 to receive the digital audio signal using an AoIP, extract the digital audio message or signal, convert the same to an analog audio signal, amplify it, perform other processing as necessary, and transmit the amplified/processed analog audio signal to other loudspeakers as the case may be. In addition, although not shown in FIG. 4, but which is shown in FIG. 9, there can be an audio rotary switch system 900 that can select a power output from an integrated circuit amplifier (IC Amp) through which the analog audio signal can be amplified and transmitted to other active or passive loudspeakers. FIG. 9 is described in greater detail below.

Figure 7:
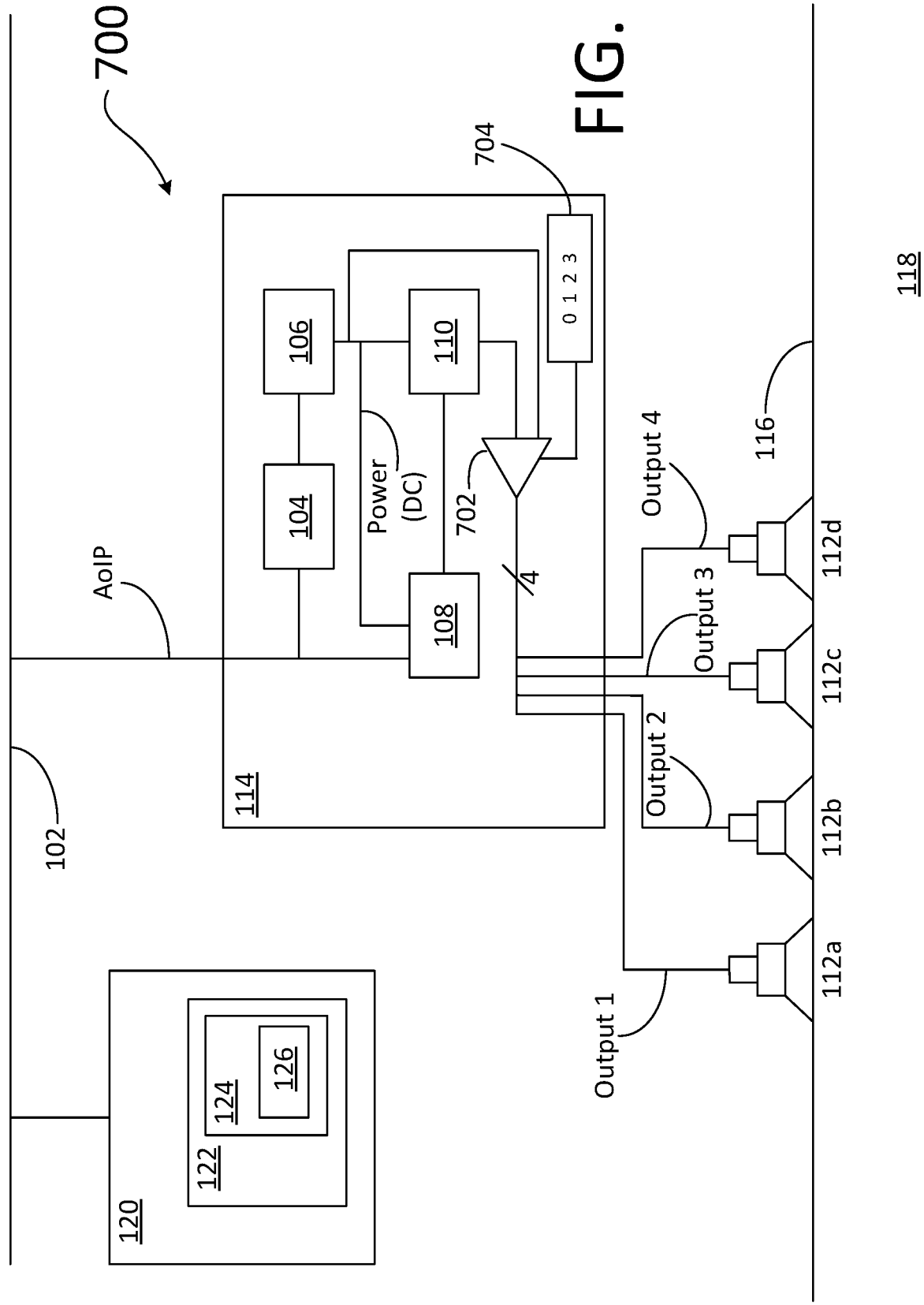
FIG. 7 illustrates a block diagram of an in-ceiling mounted loudspeaker system with an M-of-N amplifier output selector switch and multi-output amplifier according to aspects of the embodiments.

FIG. 7 illustrates a block diagram of an in-ceiling mounted loudspeaker system (loudspeaker system 700) with M-of-N amplifier output selector switch 704 and multi-output amplifier 702 according to aspects of the embodiments.

A substantial portion of the components of loudspeaker system 700 are substantially similar in form and function as those of loudspeaker systems 100, 200, 300, 400, 500, and 600 and therefore, in fulfillment of the dual purposes of clarity and brevity, a detailed discussion will not be made of those components in regard to FIG. 7. The embodiments of FIG. 7, however, do contain additional features, such as multi-output amplifier 702 with selectable multiple outputs, and M-of-N amplifier output selector switch (switch) 704. Switch 704 in this non-limiting case, is a 1-of-4 output selector switch that sends a signal to multi-output amplifier 702 that causes it to output pre-defined signals on 1-of-4 outputs. That is, when a first position is selected in switch 704, a first signal is output on a first output line (output 1). When a second position is selected in switch 704, a first and second signal is output on the first and second output lines (output 1 and output 2), according to aspects of the embodiments. When a third position is selected in switch 704, a first, second, and third signals are output on the first, second, and third output lines (output 1, output 2, and output 3), according to aspects of the embodiments. When a fourth position is selected in switch 704, a first, second, third, and fourth signals are output on first, second, third, and fourth output lines (output 1, output 2, output 3, and output 4), according to aspects of the embodiments.

The first switch setting of switch 702 can be referred to as "full power mode" as all or substantially all of the power output of amp 704 is directed to loudspeaker 112a, with none provided to the other loudspeakers 112b-d. In a second switch setting, which can be referred to as "split power mode," about half the power is directed to loudspeaker 112a, and the other half to loudspeaker 112b, which can be a low input impedance loudspeaker, though that need not necessarily be the case. In a third switch setting, which can be referred to as "first distributed power mode," about one-third of the power goes to each loudspeaker 112a, 112b, and 112c. In the fourth switch setting, which can be referred to as "second distributed power mode," about one-fourth of the power goes to each of the four speakers 112a, 112b, 112c, and 112d, substantially equally. According to further aspects of the embodiments, the power division does not have to be even in the second through fourth switch settings, as the power output per output channel of amp 702 is substantially fully programmable. According to further aspects of the embodiments, there can be fewer or more output channels from amp 702, and switch 704 can be modified accordingly. According to still further aspects of the embodiments, such power distribution can be changed remotely via messages conveyed via cable 102 in an Ethernet digital command, or can be changed manually, or wirelessly, via a known wireless transceiver that is not shown in FIG. 7, for the dual purposes of clarity and brevity. According to still further aspects of the embodiments, the changing of the output power distribution can be preprogrammed to occur automatically based on sensor inputs (not shown) that include one or more of the following: one or more microphones; one or more heat sensors; one or more light detectors; one or more motion detectors; one or more radar detectors (i.e., determining the presence or absence of one or more people using high frequency pulsed radio waves, similar to how an airborne radar system detects aircraft), among other known and not-presently known sensor systems.

According to an aspect of the embodiments, only passive loudspeakers 112 were shown in FIG. 7, although that need not necessarily be the case. One or more of the loudspeakers can be active loudspeaker 406 that include circuitry to extract the digital audio signal (if the signal were to be transmitted in a digital manner, i.e., AoIP), convert the same to an analog audio signal, perform frequency crossover if needed, and amplify the audio signal through speaker amp 404 (not shown) and broadcast the same from the loudspeaker. In this case, PoE can also be used to power the active loudspeaker 406 because the audio signal is an AoIP signal with the power carried within the PoE cabling (Cat5) according to aspects of the embodiments.

According to still further aspects of the embodiments, loudspeaker systems 100, 200, 300, 400, 500, 600, and 700 can zone off certain loudspeakers 112/406 dynamically; that is, the user or operator of loudspeaker systems 100, 200, 300, 400, 500, 600, and 700 can create divisible spaces, each of which can have any number of loudspeakers 112/406. It is sometimes the case that loudspeaker systems 100, 200, 300, 400, 500, 600, and 700 are located in one large room; according to aspects of the embodiments, that room can then be sub-divided into practically any number of sub-rooms. By way of non-limiting example only, if a room exists within which are 100 loudspeakers 112/406 (from hereon in, the loudspeakers will be referred to only in regard to passive loudspeaker 112, though that need not necessarily be the case as the loudspeakers can be all passive, all active, or any combination thereof), a first sub-division can comprises 25 loudspeakers 112, a second sub-division can comprises 30 loudspeakers 112, and a third, and final sub-division of loudspeakers 112, can comprise 45 loudspeakers 112. Furthermore, such subdivisions of loudspeakers 112 can be changed substantially instantaneously, and can be based on position, or time of day, or even the day of the week, or on any other of innumerable bases. Thus, according to aspects of the embodiments, the sub-divisions need not be permanent, but can be, or can change at any time, dependent upon circumstances. In addition, there can multiple such sub-divisions at any one time. By way of non-limiting example, a first sub-division can comprise all loudspeakers 112 in a room for emergency announcements. A second sub-division can be used for the purposes of different types of music, and a third sub-division can be for different types of emergency announcements. For example, suppose there was the case of an armed shooter in the building, and the authorities had decided to lock the building down; then, it might make sense for everyone in one room to hear the same message: "Room one is in lockdown, armed intruder, stay away from windows and doors." Or, in the case of a fire in the building, the authorities want people to use the closest exit; therefore, the front half of the room can hear the announcement "A fire situation exists, please head to the north exit door" (which is located in the front half of the room), while the rear half of the room can hear the announcement "A fire situation exists, please head to the south exit door" (which is located in the rear half of the room). In this manner, some people will head to one exit, and some people will head to the other, and egress from the room could arguably occur more rapidly.

According to still further aspects of the embodiments, loudspeaker systems 100, 200, 300, 400, 500, 600, and 700 can pre-assign unique IP addresses to each enclosure 114 as it is brought on line into the respective systems 100-700, or the enclosures can be manufactured with unique IP addresses, or they can be set manually during installation. In addition to the unique IP addresses assigned to each enclosure 114, each enclosure 114 can also have a common IP address such that if any of the respective loudspeaker systems 100-700 desires to generate a universal broadcast, it can use the common address assigned to all of the enclosures that are part of the respective loudspeaker system and transmit the digital messages in that manner. According to further aspects of the embodiments, each digital message can contain a digital audio message and a digital command and control message. Such digital messages can be broadcast using an audio-over-internet protocol (AoIP).

According to further aspects of the embodiments, groups of loudspeakers 112 can be dynamically be adjusted to the room size. Another benefit is that in certain conditions the speakers can direct listeners based on their location, so in an emergency condition the speakers in a certain zone can tell users to exit to one side versus speakers in another zone that steer people in another direction. Thus, according to aspects of the embodiments, "intelligence" can be implemented on how to steer traffic from a room.

According to still further aspects of the embodiments, sensing microphones can be added to any one of loudspeaker systems 100, 200, 300, 400, 500, 600, and 700, which then develops said loudspeaker systems into an adaptive loudspeaker system. By way of non-limiting example, as the as the acoustic space use changes with higher ambient noise and more absorption due to a greater number of occupants entering into the acoustic space, DSP 110 can be manipulated to optimize performance. Such optimization can apply to a variety of products including Smart Sound Bars or UC-DSP systems that are or will be manufactured by Crestron Electronics®, Inc., of Rockleigh, N.J.

Figure 8A:
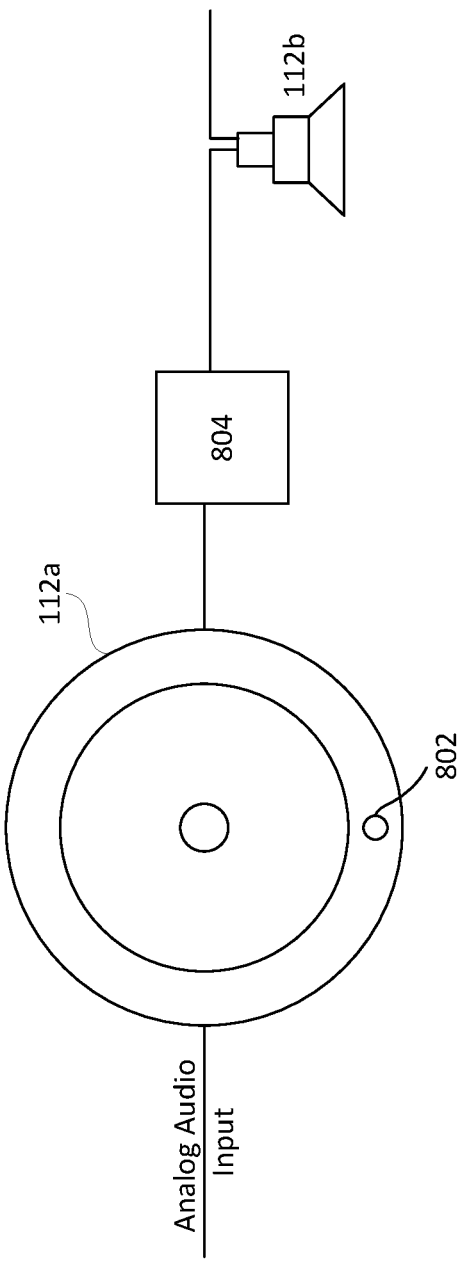
FIGS. 8A and 8B illustrate a use of a rotary power selection switch in conventional passive analog loudspeaker systems.
Figure 8B:
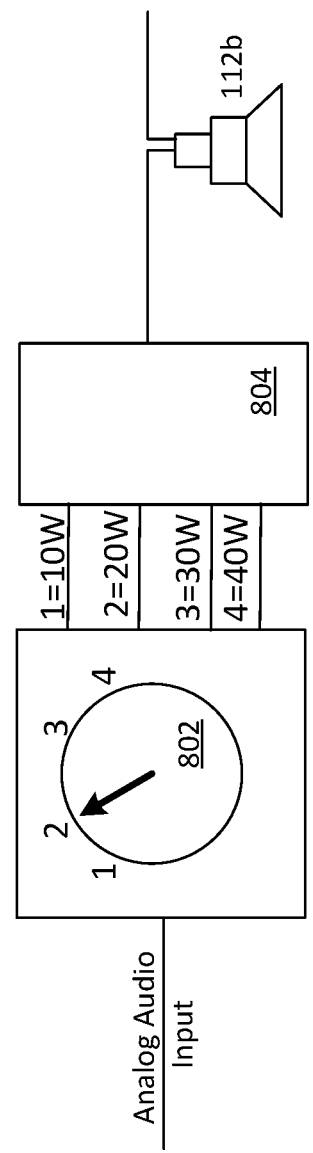

FIG. 9 illustrates an active amplifier power output switch circuit (switch circuit) 900 according to aspects of the embodiments. Switch circuit 900 can be used in any one of the embodiments, illustrated in FIGS. 1-7, though most predominately in regard to the aspects of the embodiments illustrated in regard to FIGS. 4-7. FIGS. 8A and 8B described above discussed the conventional manner in which audio was distributed from speaker to speaker when the signal was generated and received using a conventional analog system. However, as described above in regard to the aspects of the embodiments, storing, transmitting/distributing, and receiving audio in a digital format, using AoIP and PoE techniques has specific advantages as described herein. One such advantage is the transfer, using just one medium, the Ethernet cable, of both the audio signal (AoIP) and the power that can be used to receive, extract, amplify, filter, process and transmit/distribute the audio signal to other loudspeakers. As discussed above, the AoIP signal can be received directly by active speakers 406 through Ethernet connections according to aspects of the embodiments. That is, it is not necessary for AoIP signals to be received and processed using the additional circuitry located within enclosure 114, but that substantially similar circuitry can be located within each active loudspeaker 406 to receive the digital audio signal using an AoIP, extract the digital audio message or signal, convert the same to an analog audio signal, amplify it, perform other processing as necessary, and transmit the amplified/processed analog audio signal to other loudspeakers as the case may be.

Switch circuit 900 can be implemented in any of the active loudspeakers 406 of FIGS. 4-7. In switch circuit 900, the digital audio signal has been extracted and converted to an analog format, using circuitry that can be powered from power extracted from the Ethernet cable that connects to loudspeaker 406; that is, according to aspects of the embodiments, this one Ethernet cable transfers digital audio and power. Once extracted, the digital audio signal can be processed in the digital domain using a DSP, and/or converted to an analog format. The analog audio signal can be further processed in the analog domain (filtered, and/or other analog processing techniques applied to it), or amplified through a first amplifier 404 as shown in FIGS. 4 and 9, among others. The analog audio signal can then be input to a separate amplifier 404b prior to being broadcast from the loudspeaker 406 within which switch 902 is located. The analog audio signal can then be sent to a second, separate amplifier 404b the output power of which can be selected through use of switch 902; this is shown by the output power control line from switch 902 to amplifier 404b. The output of amplifier 404b is then wired to one or more loudspeakers 112, although other active loudspeakers 406 can also be used. Switch 902 can also be used in place of switches 402/502 according to aspects of the embodiments.

Figure 10:
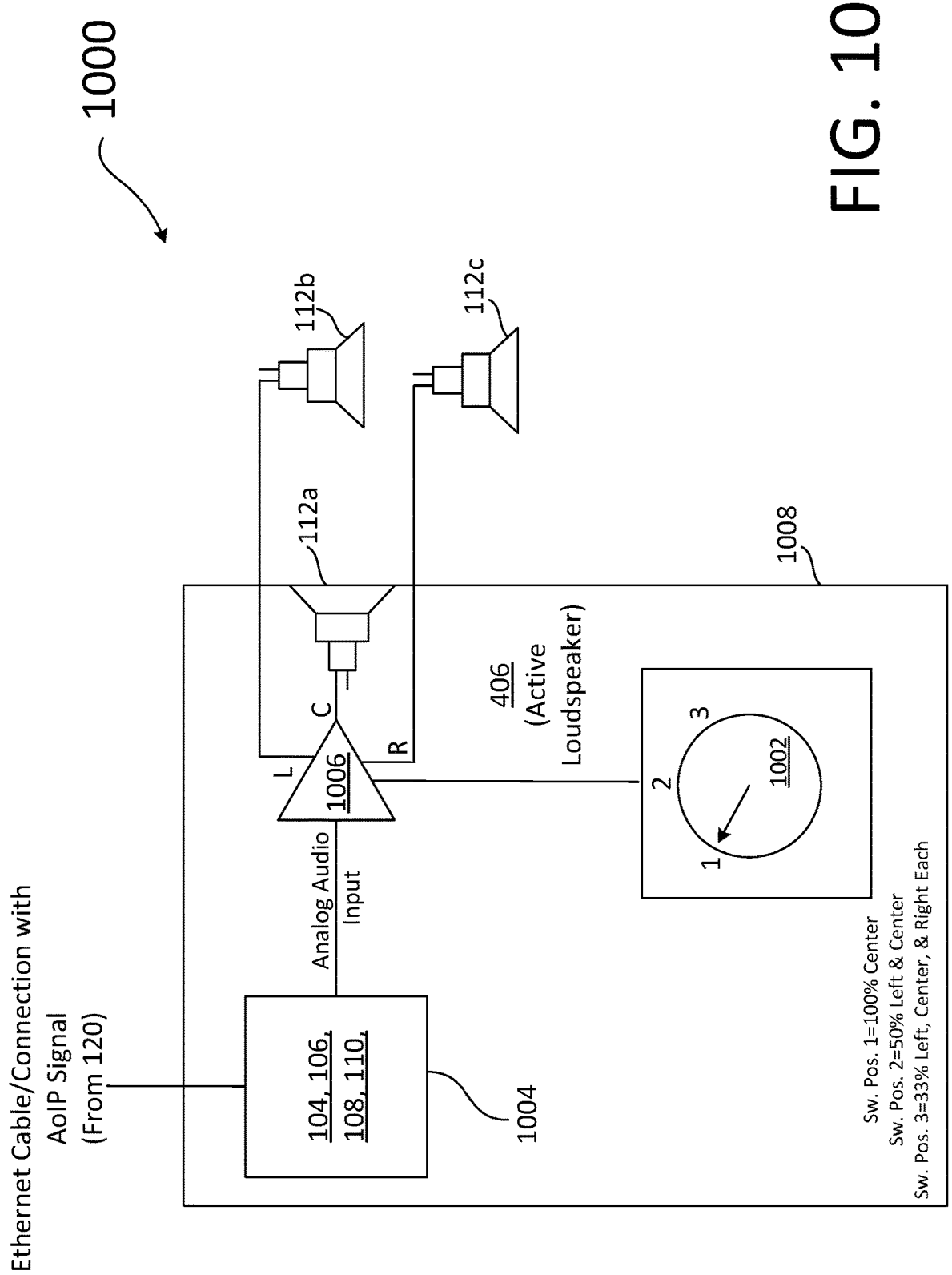
FIG. 10 illustrates an active amplifier loudspeaker system for use with digital audio over Internet protocol transmissions according to aspects of the embodiments.

FIG. 10 illustrates active amplifier loudspeaker system (loudspeaker system) 1000 for use with digital AoIP transmissions according to aspects of the embodiments. Loudspeaker system 1000 substantially replaces enclosure 114, such that digital AoIP can be received directly by a loudspeaker that is located in a ceiling. Loudspeaker 1000 comprises loudspeaker assembly 1008, processing circuitry 1004, amplifier output switch 1002, and tri-output amplifier 1006 according to aspects of the embodiments. Processing circuitry 1004 includes items 104, 106, 108, and 110 as described above, and thus, in fulfillment of the dual purposes of clarity and brevity a detailed discussion thereof need not be repeated again. Digital AoIP signals are received and processed directly by processing circuitry 1004 located within loudspeaker assembly 1008.

In regard to the use of Ethernet and using AoIP, one advantage is the transfer, using just one medium —the Ethernet cable— of both the audio signal (AoIP) and the power that can be used to receive, extract, amplify, filter, process and transmit/distribute the audio signal to other loudspeakers. The AoIP signal can be received directly by loudspeaker system 1000 through Ethernet connections according to aspects of the embodiments. That is, it is not necessary for AoIP signals to be received and processed using the additional circuitry located within enclosure 114 as discussed above, but substantially similar circuitry can be located within loudspeaker system 1000 to receive the digital audio signal using an AoIP, extract the digital audio message or signal, convert the same to an analog audio signal, amplify it, perform other processing as necessary, and transmit the amplified/processed analog audio signal to other loudspeakers as the case may be.

In loudspeaker system 1000, the digital audio signal has been extracted and converted to an analog format, using circuitry that can be powered from power extracted from the Ethernet cable that connects to loudspeaker 406; that is, according to aspects of the embodiments, this one Ethernet cable transfers digital audio and power. Once extracted, the digital audio signal can be processed in the digital domain using a DSP, and/or converted to an analog format. The analog audio signal can be further processed in the analog domain (filtered, and/or other analog processing techniques applied to it), or amplified through a first amplifier 404 as shown in FIGS. 4 and 9, among others. The analog audio signal can then be input to amplifier 1006 prior to being broadcast to loudspeakers 112*a-c*.

In place of amplifier 128 in loudspeaker system 1000, however, there is tri-output amplifier (amp) 1006. Amp 1006 according to aspects of the embodiments, accepts an analog audio signal input, and can output the amplified audio signal on up to three outputs; output left (L), output center (C), and output right (R), depending on a signal received from amplifier output selection switch 1002. That is, the different outputs are selectable by amplifier output switch 1002, which is a three position switch. When switch 1002 is placed in switch position 1, a signal is generated by switch 1002 and transmitted to amp 1006 that causes amp 1006 to be adapted to output substantially 100% of its output gain or power to output center, i.e., loudspeaker 112*a* according to aspects of the embodiments.

When switch 1002 is placed in switch position 2, a signal is generated by switch 1002 and transmitted to amp 1006 that causes amp 1006 to be adapted to output substantially 50% of its output gain or power to both output center and output left, i.e., 50% to each of loudspeakers 112*a* and 112*b* according to aspects of the embodiments.

When switch 1002 is placed in switch position 3, a signal is generated by switch 1002 and transmitted to amp 1006 that causes amp 1006 to be adapted to output substantially 33% of its output gain or power to each of outputs center, left, and right, i.e., 33% to each of loudspeakers 112*a*, 112*b*, and 112*c* according to aspects of the embodiments.

As those of skill in the art can appreciate, the terms left (L), center (C), and right (R) do not denote stereo components, but are just identifiers similar to a "geographical" designator, and could be referenced as outputs 1, 2, and 3.

According to further aspects of the embodiments, other types of amplifiers can also be used with different numbers of outputs. That is, according to further aspects of the embodiments, there can be less than three outputs, or even more outputs, limited by power and space considerations but which are not a limitation to the aspects of the embodiments. According to further aspects of the embodiments, the number of amps 1006 and respective outputs are a function of the input power available as received from the PoE circuitry. Currently available PoE provides about 15 watts of power; PoE+ provides about 30 watts of power; PoE++ provides about 60 watts of power; and Higher Power PoE can provide about 100 watts of power. Thus, according to further aspects of the embodiments, loudspeaker system 1000 could include multiple instances of amp 1006 to take advantage of higher available power levels, or loudspeaker system 1000 (and any of the other loudspeaker systems 100, 200, 300, 400, 500, 600, and 900) can use more loudspeakers or higher power loudspeakers 112/406. The disclosed embodiments provide a system, and a method for a completely digitally controlled in-ceiling loudspeaker systems 100, 200, 300, 400, 500, 600, 700, 900, and 1000. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

All United States patents and applications, foreign patents, and publications discussed above are hereby incorporated herein by reference in their entireties.

INDUSTRIAL APPLICABILITY

To solve the aforementioned problems, the aspects of the embodiments are directed towards a completely digitally controlled in-ceiling loudspeaker system.

ALTERNATE EMBODIMENTS

Alternate embodiments may be devised without departing from the spirit or the scope of the different aspects of the embodiments.

What is claimed is:

1. An in ceiling loudspeaker system comprising:
   a digital transmitter adapted to store, retrieve, and transmit digital messages over a network cable using an audio over internet protocol (AoIP), and wherein
      the transmitted digital messages are individually addressable using an IP address, and wherein
      the transmitted digital messages contain digital audio messages and digital command and control messages;
   a first active loudspeaker assembly adapted to have a unique IP address pre-assigned to it such that the first active loudspeaker assembly is adapted to receive the transmitted digital messages and extract the digital audio messages and the digital command and control messages from the transmitted and received digital messages, and wherein
      the first active loudspeaker assembly comprises
         a first loudspeaker, and
         additional circuitry adapted to
            extract the digital audio messages from the received digital messages,
            extract power from the network cable using a power-over-Ethernet (PoE) power extraction device, and
            output digital audio messages as a digital audio signal using an AoIP, and further wherein
         the additional circuitry is further adapted to
            convert the digital audio signal to an analog audio signal,
            broadcast the analog audio signal as an acoustic audio signal;
   an "M-of-N" selector switch adapted to generate an "M-of-N" switch signal; and
   an "N" output power amplifier adapted to receive the "M-of-N" switch signal and adapted to amplify an input audio signal at "N" different power levels and output "N" different outputs according to the received "M-of-N" switch signal, wherein
      the "M-of-N" switch signal comprises 4 different power levels, and wherein
      when M=1 the power amplifier outputs one amplified signal on a first output at about 100% of the maximum output power of the power amplifier, and
      when M=2 the power amplifier outputs two amplified signals on the first and a second output each at about 50% of the maximum output power of the power amplifier, and
      when M=3 the power amplifier outputs three amplified signals on the first and second outputs and a third output each at about 33% of the maximum output power of the power amplifier, and
      when M=4 the power amplifier outputs four amplified signals on the first, second, and third outputs and a fourth output each at about 25% of the maximum output power of the power amplifier.

* * * * *